April 14, 1925.  
E. W. SPALDING  
GEAR SHIFT  
Original Filed Sept. 17, 1923    5 Sheets-Sheet 1

E. W. Spalding INVENTOR
BY Victor J. Evans ATTORNEY

WITNESSES

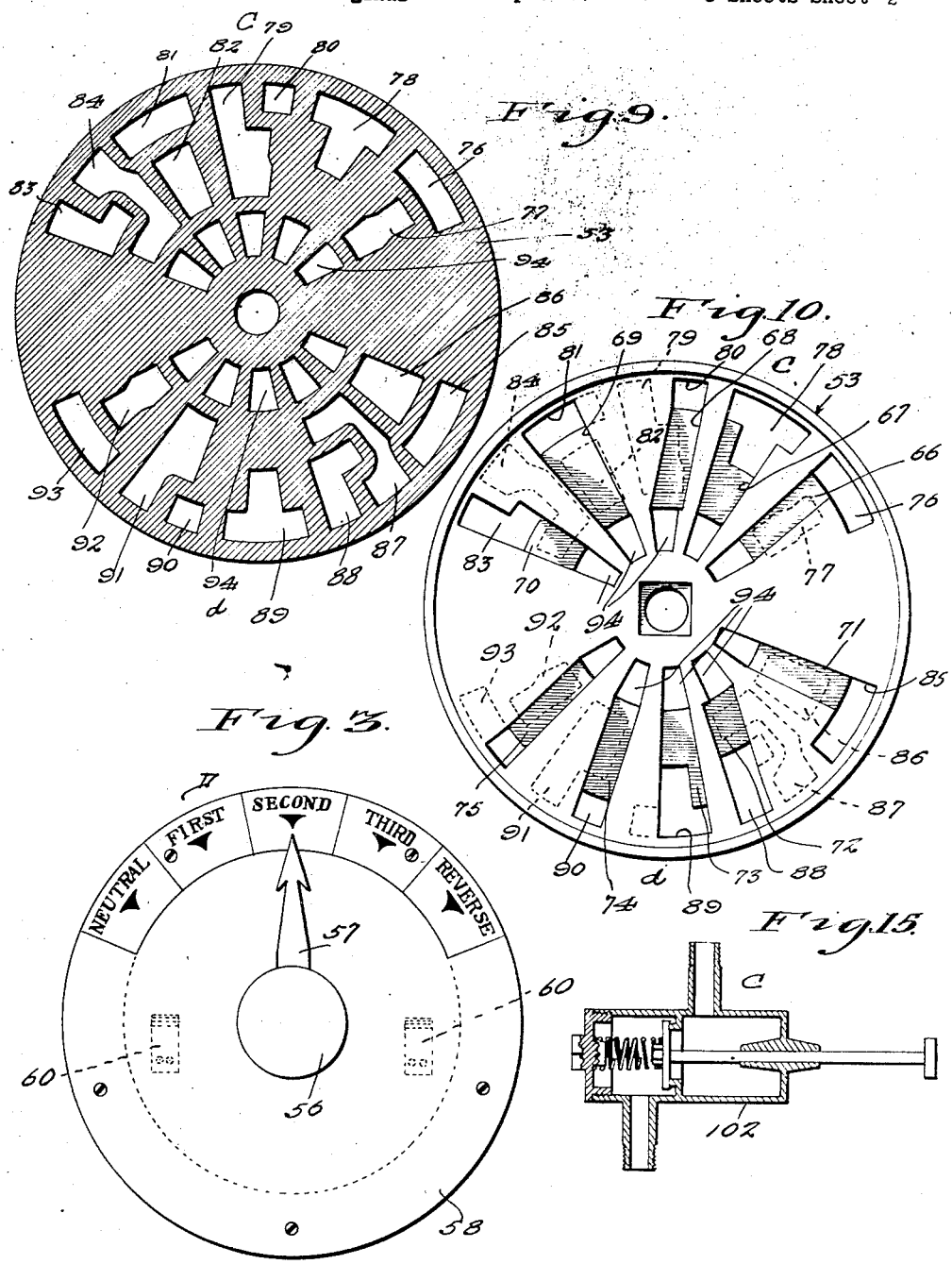

April 14, 1925.  
E. W. SPALDING  
GEAR SHIFT  
Original Filed Sept. 17, 1923 5 Sheets-Sheet 3  
1,533,215
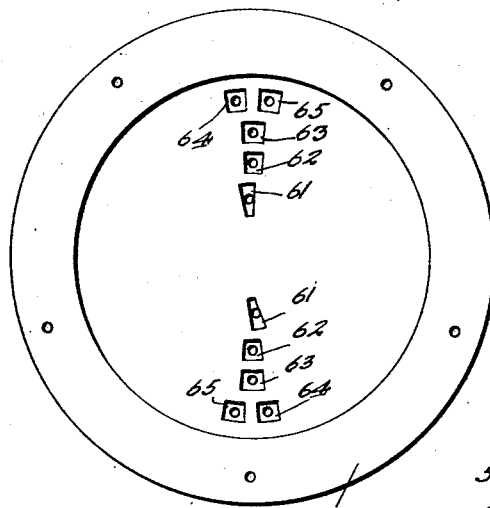
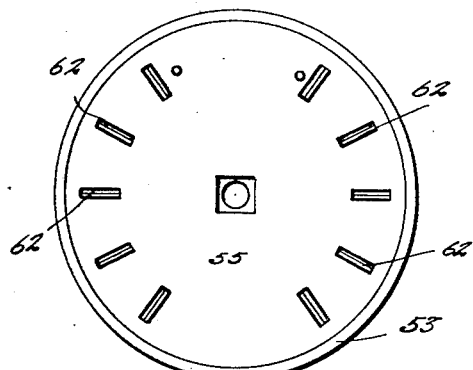
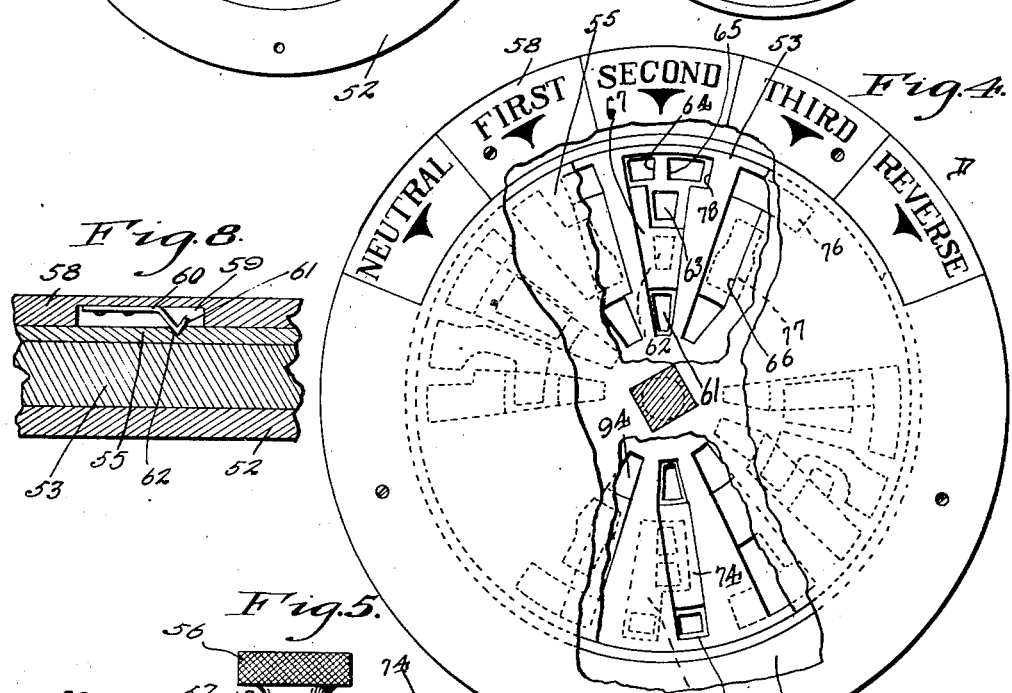
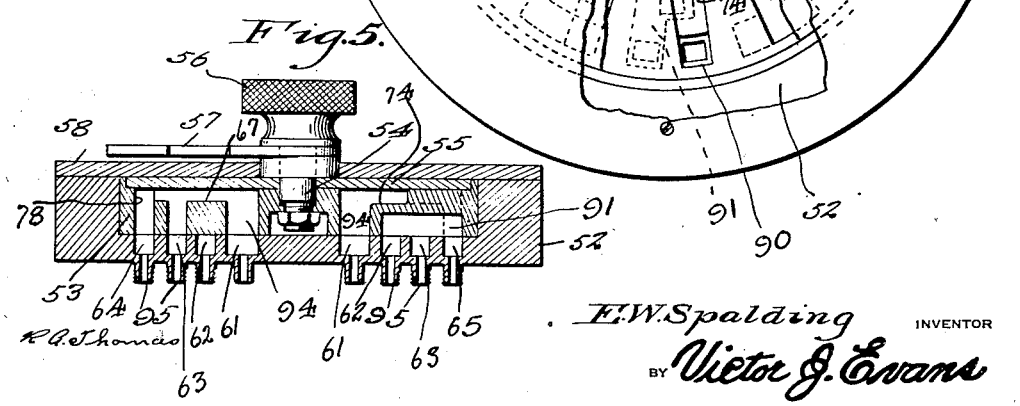
E.W. Spalding INVENTOR
BY Victor J. Evans ATTORNEY
WITNESSES April 14, 1925.
E. W. SPALDING
GEAR SHIFT
Original Filed Sept. 17, 1923  5 Sheets-Sheet 4
1,533,215
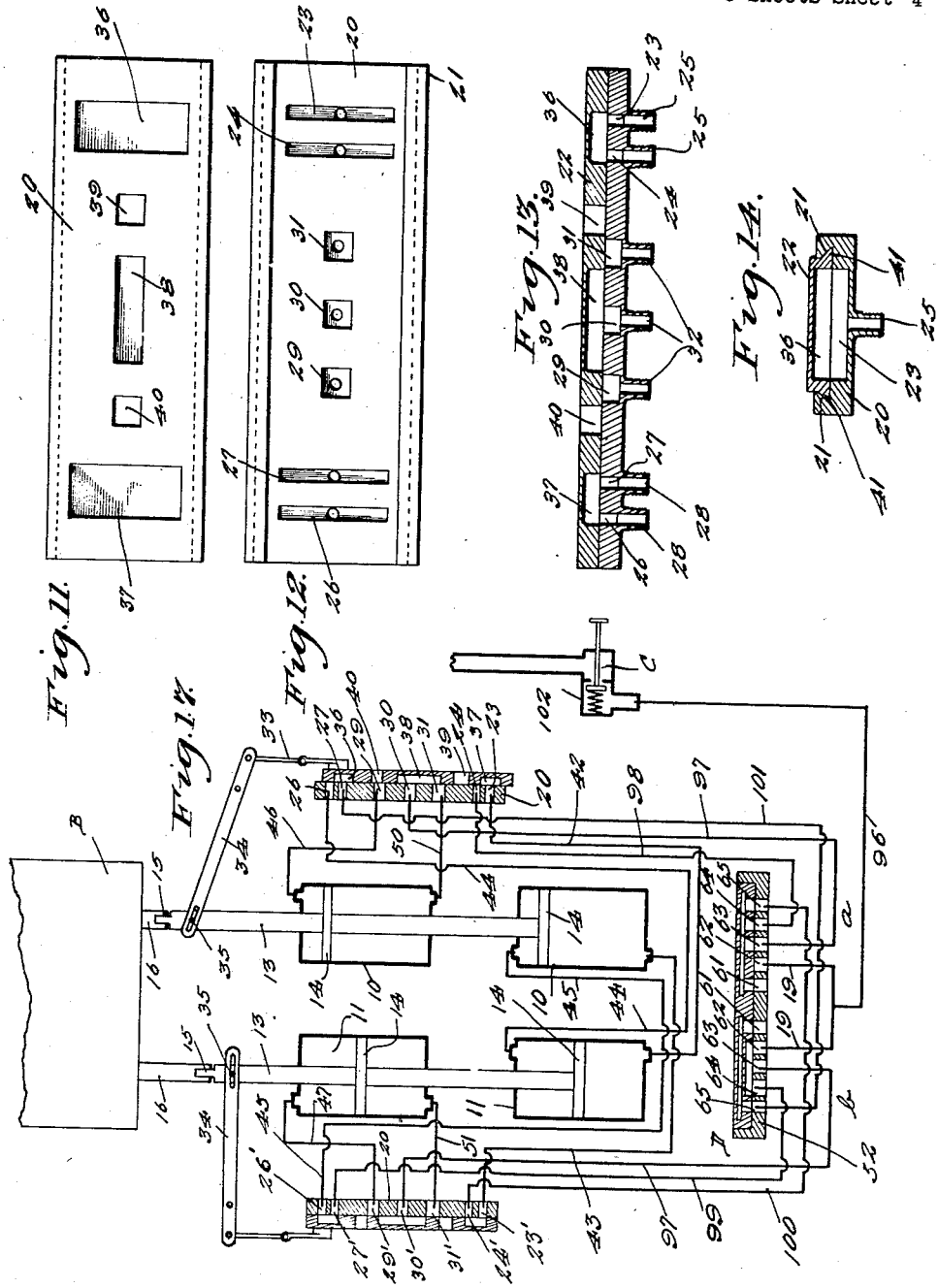

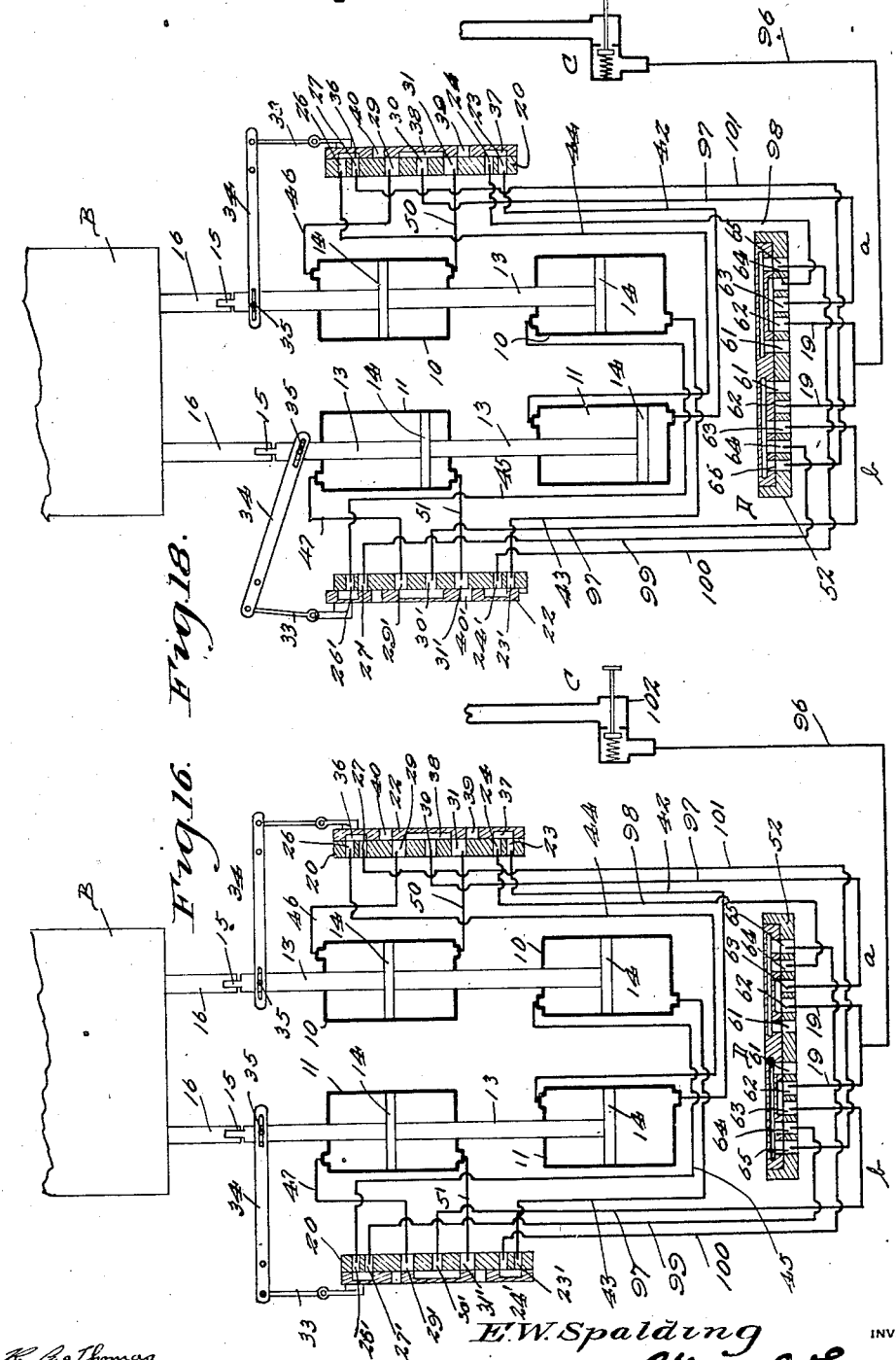

Patented Apr. 14, 1925.

1,533,215

UNITED STATES PATENT OFFICE.

ELTON W. SPALDING, OF DURANGO, COLORADO.

GEAR SHIFT.

Application filed September 17, 1923, Serial No. 663,246. Renewed November 26, 1924.

*To all whom it may concern:*

Be it known that I, ELTON W. SPALDING, a citizen of the United States, residing at Durango, in the county of La Plata and State of Colorado, have invented new and useful Improvements in Gear Shifts, of which the following is a specification.

This invention relates to motor operated vehicles, and more particularly to a gear shift mechanism.

The invention has for its chief characteristic, the provision of a vacuum actuated gear shift mechanism, as a substitute for the usual gear shift lever now employed in conjunction with the selective type transmissions.

In carrying out the invention, I provide a group of cylinders arranged and used in pairs for selectively shifting the gears of the transmission, the pistons operating in the cylinders of said mechanism and actuated by a vacuum created in the intake manifold of the engine, and also by the admittance and exhaust of air from the cylinders so actuated, and simultaneously with the creation of a vacuum in the cylinders for the purpose stated.

An important object of the invention resides in the provision of a rotary valve designed to selectively establish communication between the intake manifold of the engine and the cylinders above referred to, which valve is arranged within convenient reach of the driver, so that it can be set to shift the gears into any particular speed afforded by the particular type of transmission, the communication between the intake manifold and the selective cylinders, and through the valve being controlled by a normally closed valve arranged to be actuated incident to the depression of the clutch pedal so that the gears are not shifted under any circumstances until the clutch is disengaged.

A further and very important object of the invention resides in the provision of a slide valve associated with one cylinder of each pair, and designed to cooperate with the rotary valve above mentioned to control the communication between the intake manifold of the engine and the cylinders of the gear shift mechanism, so that the proper pair of cylinders operate at the proper time, the slide valve being automatically controlled to positively prevent the operation of the other pair of cylinders, by the piston rod, incident to its movement within the piston under the suction created in a particular cylinder as above stated.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 3 is a plan view of the rotary valve.

Figure 4 is a similar view partly in section.

Figure 5 is a transverse sectional view through the valve.

Figure 6 is a bottom plan view of the valve.

Figure 7 is a view of the top plate of the valve.

Figure 8 is a fragmentary sectional view showing the manner in which the valve is held in a given position.

Figure 9 is a sectional view through the valve showing the different arrangement of the by-passes and openings therein.

Figure 10 is a plan view of the valve with the top plate removed showing the relative arrangement of the passages and the upper surface of the valve with relation to the by-pass illustrated by dotted lines.

Figure 11 is a bottom plan view of the slide valve.

Figure 12 is a plan view of the fixed section thereof.

Figure 13 is a longitudinal sectional view through the valve.

Figure 14 is a transverse sectional view therethrough.

Figure 15 is an enlarged sectional view through the valve adapted to be actuated by the clutch pedal and controlling communication between the intake manifold of the engine and the cylinders of the gear shift mechanism.

Figure 16 is a view partly in section showing the position of the parts when the gears of the transmission are in neutral position.

Figure 17 is a similar view showing the arrangement of parts in first speed position.

Figure 18 is a similar view in second speed position.

Figure 1:
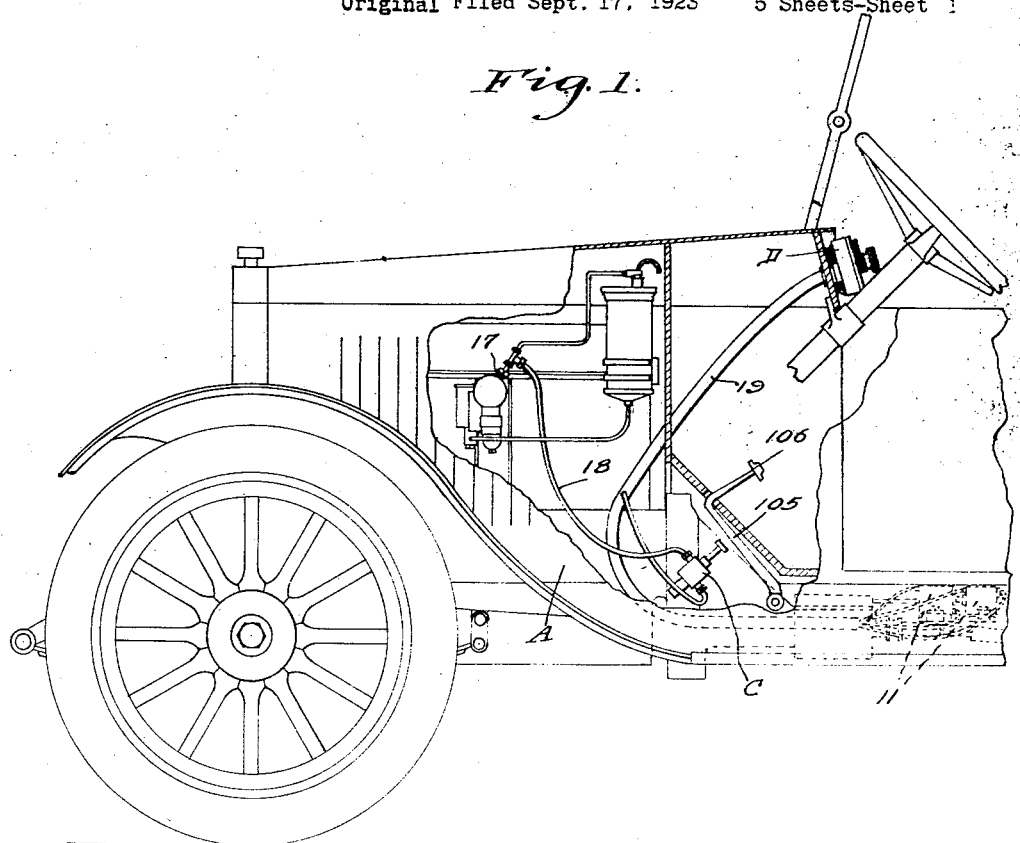
Figure 1 is a fragmentary view of a motor operated vehicle showing the application of the invention.
Figure 2:
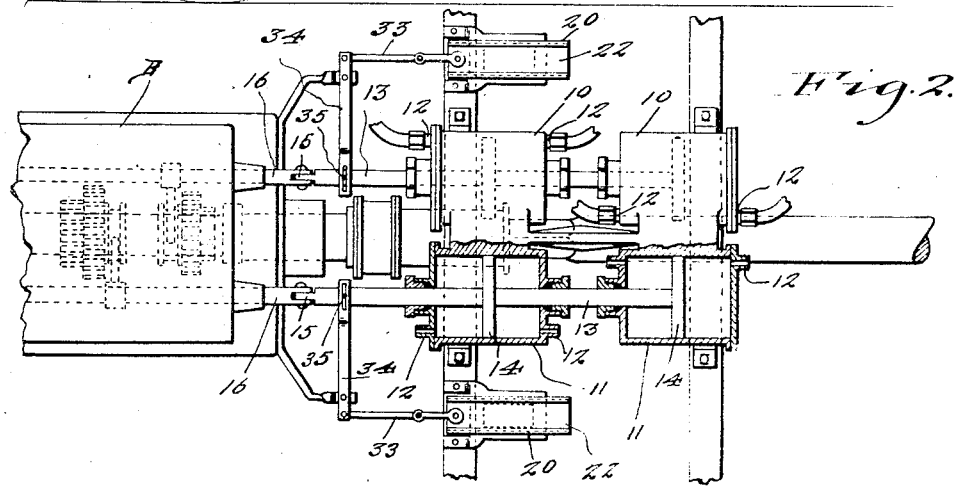
Figure 2 is a plan view of the cylinders partly in section and also showing the connection between these cylinders and the transmission gears.

Referring to the drawings in detail, and particularly to Figures 1 and 2, A indicates a portion of the motor operated vehicle, and these figures illustrate the manner in which the mechanism is mounted on the vehicle for the purpose intended. As above stated, the mechanism is actuated by a vacuum created in certain of a group of cylinders, clearly shown in Figure 2, for the purpose of operating the piston in said cylinders, the rods of which are operatively connected with the gears of the transmission. These cylinders are mounted at any appropriate place on the running gear of the vehicle as shown in Figure 2, and are arranged in pairs for use. One pair of these cylinders is indicated at 10 while the other pair is indicated at 11. Each cylinder is provided with a nipple 12 at each end thereof, and associated with these nipples are pipes to be hereinafter described, for the purpose of admitting or exhausting air from the cylinders at either side of the pistons operating therein. Sliding through each pair of cylinders is a piston rod 13, and each rod is equipped with two pistons 14, one for each cylinder. In neutral position, these pistons are arranged centrally of their cylinders, the pistons on each rod moving in unison as will be readily understood. The piston rods 13 are suitably connected as at 15 to the sliding rods or shafts 16 forming part of the transmission mechanism indicated generally at B, so that the gears are shifted incident to the reciprocatory motion of either of the piston rods 13. A vacuum formed selectively in the cylinders referred to, is created by the suction from the intake manifold 17 of the engine. As shown in Figure 1, a pipe 18 leads from the intake manifold 17 to a valve C, while leading from this valve C are suitable pipes 19 which communicate with a rotary valve D mounted upon the dash board of the vehicle, the valve D being operatively associated with suitable pipes or conduits which establish communication between the valve and the cylinders 10 and 11 in a manner to be hereinafter described. However, the communication between the intake manifold and the cylinders 10 and 11 through the course just outlined, is controlled by the valve C, which is normally closed cutting off said communication, and which is opened only when the clutch pedal is depressed to disengage the clutch. Consequently, the gears of the transmission B can never be shifted casually or otherwise until the clutch has been disengaged.

The mechanism for establishing communication between the intake manifold and either pair of cylinders 10 and 11 respectively, includes a slidable valve for each pair of cylinders. These valves are arranged at one side of the cylinders as clearly shown in the drawings, and normally arranged as illustrated in Figure 16. Each of these valves includes a stationary body portion 20 which is provided with longitudinal grooves 21 to accommodate the sliding or movable part 22 of the valve proper. These parts are substantially the same length and the sliding portion 22 of the valve is actuated by the movement of the adjacent piston rod 13. Consequently, the valve is not shifted or actuated until after suction has been created in the operating cylinders, and the pistons therein moved in one or the other directions. The body portion 20 of each of the valves above mentioned is provided with spaced parallel slots adjacent each end of said body portion, and arranged in pairs transversely thereof. One pair of these slots is represented at 23 and 24 respectively, while projecting from one side of the body portion and communicating centrally with these slots are threaded nipples 25 for a purpose to be hereinafter described. The similar slots arranged at the other end of the body portion and indicated at 26 and 27 respectively, each communicating with a threaded nipple 28 as shown. In addition to these slots, the body portion 20 is provided with spaced openings 29 and 30 and 31 respectively arranged along the longitudinal center of the body portion, each opening communicating with the nipple 32 as clearly shown in Figure 13. Certain of the openings and slots of the valve just described communicates with the cylinders 10 and 11, while other of said openings and slots communicate with the intake manifold 17, through the rotary valve D above referred to. Consequently, the rotary valve, to be hereinafter described, is actuated to selectively control the particular cylinders to be operated for the purpose of shifting the gears, but the communication between the same cylinders and the atmosphere, for the purpose of admitting air into the cylinders at the opposed sides of the pistons therein, wherein the vacuum is created is controlled by the sliding valve shown. The slidable part 22 of each of these valves is connected to an arm 33 which projects from one end of a lever 34 having a slot and pin connection 35 with the adjacent piston rod 13, so that the moving part 22 of each valve is actuated from said rod. The construction of this part 22 is clearly shown in Figures 11 and 13 respectively, wherein it will be noted that the underside of this moving part is provided adjacent each end with transverse recesses 36 and 37 respectively, the recesses 36 normally bridging the slots 23 and 24 of the body portion of the valve, while the recess 37 normally bridges the slots 26 and 27 of said valve. Along the longitudinal center of the movable part of the valve, the latter is formed with a recess 38 which normally extends across the central opening 30 of the body portion 20, and with additional recesses 39 and 40 which are arranged beyond the adjacent openings 29 and 31 of the body portion, so that the recesses 39 and 40 are singly moved into and out the adjacent openings 29 and 31 in a manner and for a purpose to be hereinafter more fully described. It will be noted however, from the structure shown in Figure 13 that these openings 29 and 31 are normally closed by the movable part 22. It will be further observed that the movable part 22 is provided with flanges 41 to be received by the grooves 21 in the body portion of the valve.

Now, it will be noted from an inspection of Figure 17, that a pipe 42 has one end coupled with the nipple 25 of the slot 23 of said valve, while the other end of this pipe communicates with the adjacent end of one of the cylinders 11. In the same manner, the pipe 43 has one end connected with the nipple of the corresponding slot 23′ of the valve arranged adjacent the cylinders 11, while the opposite end of this pipe 43 communicates with the adjacent end of one of the cylinders 10. A pipe 44 has one end communicating with the opposite end of the cylinder 11 just referred to, the other end of this pipe 44 being coupled with a nipple 28 projecting from the slot 26 of the slide valve. Communicating with the corresponding end of the adjacent cylinder 10 is a pipe 45, the other end of which communicates with the corresponding slot 26′ of the valve at the other side of the mechanism. The other cylinder of the pair 10 has a pipe 46 communicating with one end thereof and also with the opening 29 of the adjacent slide valve, while a similar pipe 47 establishes communication between the corresponding end of the cylinder 11 and the opening 29′ of the other slide valve. The pipe 50 leads from the lower end of one of the cylinders 10 and communicates with the opening 31 in the adjacent slide valve. A pipe 51 in the other side of the mechanism leads from the lower end of the corresponding cylinder 11 and opens into the opening 31′ of the adjacent slide valve. The other openings or ports of these slide valves communicate with the intake manifold 17, but only through a rotary valve which will be presently described, and which valve is designed to establish communication between the intake manifold and either pair of the cylinders represented at 10 and 11.

This rotary valve includes an annular casing or body portion 52 which is of hollow formation to receive the valve proper as clearly illustrated in Figure 5. This valve proper is indicated at 53, and has an opening centrally thereof to accommodate a stem or pin 54 depending from an annular plate 55 which reposes upon the valve and is connected to the latter to be rotated in unison therewith. These parts are rotated by means of a knob or the like 56 which is secured to the plate 55, and carried by this knob is a pointer 57 which moves over a cover 58 cooperating with the indicia thereon to enable the driver to properly position the valve for the purpose of shifting the gears of the selective type transmission to any particular speed, or to neutral position. This indicia consists of the words "Neutral," "First," "Second," "Third," and "Reverse." The cover is recessed on its underside as at 59, and arranged in this recessed portion is a resilient element 60 having a substantially V-shaped terminal 61. This element is so designed and arranged that the terminals 61 is received singly by the notches or recesses 62 in the plate 55, as the valve is rotated in one or the other direction, and consequently, the valve is held fixed in any given position through the instrumentality of this spring 60. The bottom of the valve casing 52 is provided with opposed series of radially disposed ports, there being preferably five of such ports in each series. The ports of each series beginning with the innermost to the outermost port are indicated at 61, 62, 63, 64, and 65 respectively as clearly shown in Figure 6. For the purpose of identifying the ports hereinafter, of either series in the further description of the invention, one series will be referred to as series $a$ and the other series, as series $b$. These ports communicate with slots and by-passes provided in the valve proper shown in Figures 9 and 10, so that when the valve is turned to anyone of its active positions, the proper port or ports of the proper series will communicate with the proper cylinders through certain openings in the slide valves to allow air to be exhausted from said cylinders at one side thereof and atmospheric pressure admitted to the same cylinders on the opposite side of the piston. The upper face of the valve 53 is provided with a plurality of radially disposed slots arranged in series as illustrated in Figure 10. There are two series of these slots, one series of slots for each series of ports $a$ and $b$ above referred to. There are five slots in each series, the slots being indicated at 66, 67, 68, 69, and 70 of series $c$, while the slots of series $d$ are indicated at 71, 72, 73, 74, and 75. The underside of the valve is provided with by-passes as shown in Figure 9, there being a by-pass for each slot above mentioned of the respective series of slots. In other words, the valve immediately beneath each slot is provided with a by-pass of a particular configuration, and by-passes made up of two portions of particular configurations, so that when the valve is adjusted, the ports in series *a* and *b* formed in the bottom of the valve casing are uncovered and communication established between the uncovered ports in proper combinations to operate the cylinders selectively, which of course depends upon the particular manner in which the transmission is to be shifted. In Figure 10, I have shown the manner in which the by-passes are arranged with relation to the slots in the upper face of the valve, the by-pass in Figure 10 being dotted. Beneath the slots 66 is arranged a by-pass made up of two parts 76 and 77 respectively shown in Figure 9, while arranged beneath slots 67 is the by-pass 78 of the particular outline illustrated in Figure 9. The slot 68 communicates with the by-pass including the two parts 79 and 80, while the slot 69 communicates with a two part by-pass, the respective parts of which are indicated at 81 and 82. The slot 70 cooperates with the two part by-pass shown in Figure 9. One part of which is indicated at 83, and the other part at 84, the latter mentioned part being shown by dotted lines in Figure 10 and its relation to the slot 70. The slots of series *a* also communicate and cooperate with a series of by-passes similar to those above mentioned, the slots 71 of this series *d* cooperating with a two part by-pass, the respective parts of which are indicated at 85 and 86. The slots 72 communicate with a two part by-pass the parts of which are shown at 87 and 88, while the slot 72 cooperates with a single by-pass of the configuration shown at 89. The slot 74 is disposed as shown in Figure 10 with relation to a two part by-pass, the parts of which are indicated at 90 and 91, while the final slot 75 also communicates with the parts 92 and 93 of a by-pass shown in Figure 9. The particular arrangement and formation of the various by-passes of each series is important, in that when the valve is rotated to change the speed of the vehicle, it is necessary that a communication be established between the right pair of cylinders and the intake manifold through the ports of one or the other series of ports indicated at *a* and *b*, the series not in use being closed, so as to prevent the other pair of cylinders being brought into use under such circumstances. It will be further noted upon inspection of Figure 9 that the valve is provided with opposed series of openings 94, there being five of the openings in each series so that no matter to what extent the valve is rotated, the innermost ports 61 of the series *a* and *b* are always uncovered and open to the atmosphere. As shown in Figure 5, the valve body 52 is provided with nipples 95 which project from each port of each series *a* and *b*, so that conduits or pipes can be suitably coupled thereto. With the exception of the innermost ports 61 of the respective series, all of the ports of both series are equipped with pipes which establish communication between this rotary valve and certain openings of the slide valves above mentioned.

For instance, it will be noted upon inspection of Figure 17, that the pipes 19 constitute branches from a main pipe 96 which leads from the valve casing C, and that these branch pipes 19 communicate with the corresponding ports 62 of the respective series *a* and *b* of the rotary valve above described. Consequently the suction from the intake manifold operates through either one of these ports and subsequently through the rotary valve and one of the slide valves to the proper cylinders in which the vacuum is to be created for the purpose above mentioned. Also communicating with each port 63 of the respective series *a* and *b* of the rotary valve is a pipe 97, these pipes leading to the adjacent slide valves and having their other ends communicating with the opening 30 and 31 respectively as shown. Another pipe 98 has one end cooperating with the rotary valve which communicates with the port 64 of the series *a*, while the other end of this pipe communicates with the slot 24 of the adjacent slide valve. A corresponding pipe 99 leads from the port 64 of the series *b*, and has its opposite end communicating with the slot 27' of the other slide valve. Leading from the port 65 of the series *a* is a pipe 100 which extends across the rotary valve and its other end communicates with the slot 24' of the slide valve arranged adjacent the cylinders 11, while the corresponding pipe 101 leading from the port 65 of the series *b* has its other end communicating with the slot 27 of the slide valve arranged adjacent the cylinders 10. By reason of this arrangement, the rotary valve can be rotated to selectively control the operation of either pair of cylinders in a manner to be presently described.

The mechanism is illustrated in Figure 16 in neutral position, while it will be noted that the pistons 14 in each cylinder is arranged midway between the ends thereof. It will be further noted that the spring pressed valve 102 which operates in the valve casing 103 is normally seated. This valve is the valve above referred to as valve C which must be opened before the gear or transmission is shifted, and that is so irrespective of what adjustment is made by means of the rotary valve D.

Now, when it is desired to shift the transmission gears from neutral into low or first speed, it is only necessary to turn the knob 56 of the rotary valve, until the pointer or finger 57 coincides with the word "First" illustrated at 58 on the cover of the rotary valve casing as shown in Figure 4. A turn of the knob 56 of course shifts the valve 53, thereby establishing communication between certain ports of the respective series a and b of this valve so that a vacuum is created in one cylinder of the pair indicated at 10, while air is admitted and exhausted from these cylinders above and below the pistons therein. In other words, assuming the parts to be in the position shown in Figure 16, and the valve D subsequently rotated for the purpose of placing the transmission mechanism in first speed, the position of the valve is then such as indicated in Figure 17, wherein it will be noted that the ports 61, 63, 64 and 65 of the series a communicate with each other by the slot 67, the by-pass 78 and one of the openings 94, it being noted that the port 62 with which one of the pipes 19 communicate being closed. In the series b of said ports, the ports 61 and 65 communicate by slot 74 and by the by-pass 90 and one of the openings 94, while the ports 62, 63, and 64 of this particular series communicate with each other through the by-pass 91. With the valve thus arranged, and the motor of the vehicle in operation, the valve 102 arranged immediately beneath the shank 105 of a clutch pedal 106 is opened, when the clutch pedal is depressed for the purpose of dis-engaging the clutch. It is only when this valve 102 is opened, that the mechanism begins to operate for the purpose of shifting the gears, inasmuch as the suction from the intake manifold through the pipe 96, and through the rotary valve in the manner to be presently described, creates a vacuum in one of the cylinders 10 at one side of the piston therein, thereby initially actuating the piston rod 13 for the purpose of shifting the gears, when the valve 53 is arranged in the position just described, the suction created through the pipe 96, has no effect whatever on the series a of the ports of the rotary valve, for the reason that the port 62 with which the branch pipe 19 is associated is closed as shown in Figure 17. However, the other branch pipe 19, of the pipe 96 creates a suction through the ports of the series b and rotary valve, inasmuch as the ports 62, 63 and 64 communicate through the by-pass 91, and it is with the port 62 that the branch pipe 19 is coupled. The pipe 97 leading from the port 63 of the series b is closed at its upper end by the slide valve as illustrated in Figure 17, the upper end of this pipe entering the central opening 30' of this valve. Consequently, no suction can be created in this particular pipe. However, inasmuch as the port 64 is in open communication with the port 62, suction is created in the pipe 99 which leads from the port 64 and enters the slot 27' of the slide valve at the left hand side of the valve 17. This slot 27' is in open communication with the adjacent slot 26' of said valve so that a suction is created through the valve in the pipe 45 which leads from the slot 26' and communicates with one end of one of the cylinders 10 as clearly shown, consequently, a vacuum is created in this cylinder above the piston 14 which moves the piston rod 13 in the direction of the transmission casing as shown. To facilitate the movement of the piston rod 13, it is necessary to introduce air into the other half of this particular cylinder in which the vacuum is created, so that the piston may have the benefit of atmospheric pressure, and at the same time admit air into the corresponding half of the other cylinder 10 and exhaust air from the latter mentioned cylinder above the piston 14. For this purpose, atmospheric pressure is admitted to the pipe 101 through the port 65 of the series a of the rotary valve, it being noted from Figure 17 that this port is in communication with the port 61 through the by-pass 78, and the port 61 is always open to the atmosphere. Consequently air passes through the pipe 101 into the slot 24 of the slide valve at the left hand side of Figure 17, the air passing through the adjacent recess 36 of this valve and then out through the slot 23' into the pipe 43, which conveys this air to the lower end of that cylinder 10 in which the vacuum was previously created. It is of course to be understood that when the piston rod 13 is shifted initially, the slide valve at the right hand side of Figure 17 is simultaneously shifted, and finally occupies the position shown in Figure 17. Just as soon as this valve occupies the position to establish communication between the opening 29 and the opening 40', the air in the other cylinder 10 at one side of the piston 14 is exhausted through the pipe 46 to the atmosphere. At the same time that the air is exhausted from this half of the cylinder 10 atmospheric pressure is admitted to the lower half of this cylinder through the pipe 50 which communicates with the opening 31 of the slide valve at the right hand side of Figure 17. Of course, this atmospheric pressure is carried through the valve through the pipe 97 at the right hand side of Figure 1, one end of which communicates with the port 63 of the series a of the rotary valve. This port communicates with the port 65 which is in open communication with the atmosphere, so that atmospheric pressure passes through the pipe 97 through the opening 30 of the slide valve thence through the recess 38 into the opening 31 of said valve, and thence through the pipe 50 into the particular cylinder. In this manner the gears are shifted automatically by means of the vacuum into first speed position, it being understood that the slide valve operates at the same time the gears are being shifted with only one valve operating at a time selectively controlled by the rotary valve D and that the gears can not be shifted, under any circumstances until the clutch pedal has been depressed.

Again, when it is desired to shift the transmission gear to second speed, rotary valve D is operated to position the parts in the manner illustrated in Figure 18. In this figure it will be noted that the ports 62, 63 and 64 of series $a$ communicate with each other, while ports 61 and 65 communicate with each other, the ports 61 being opened into the atmosphere. Consequently, when the valve 102 is opened incident to disengaging the clutch, the suction through the pipe 96, and the branch pipe 19 is conveyed to the valve D through the port 62. This suction passes through the port 63 into the pipe 97, the other end of which is closed by the slide valve at the right hand side of Figure 18, so as to have no effect whatever on the mechanism. But, the suction also passes through the port 64 of the valve into pipe 98, one end of which communicates with the slot 24 of the slide valve just mentioned, and as this slot communicates with the slot 23 of the valve, the suction passes through the valve into the pipe 45 and thence into the lower end of the adjacent cylinder 11. Thus a vacuum is created in this cylinder which shifts the piston rod 13 in the direction away from the transmission casing, thereby shifting the gears to second speed. To assist in moving the piston rod in this direction, atmospheric pressure is introduced into the other end of the cylinder 11 just referred to through the pipe 44 as shown. The air introduced into this pipe 44 passes through the rotary valve D entering the port 61 of the series $b$ which communicates with the port 65 of the same series. The air passes from the port 65 through the pipe 101, which is coupled with the slide valve at the right hand side of Figure 18 communicating with the slot 27 thereof. This slot communicates with the slot 26 in the normal position of the parts as shown in Figure 18 and consequently the air passing from pipe 101 through this valve enters the pipe 44. To further assist in moving the piston rod for the purpose stated, air is exhausted from the lower end of the other cylinder 10 and admitted into the upper end of said cylinder. The air in the lower end of the cylinder is exhausted through the pipe 51 which is connected with the lower end of the cylinder and also with the opening 31' of the slide valve adjacent said cylinder. Of course, it is to be understood that while the piston rod 13 is being moved to the position shown in Figure 15, the slide valve at the left hand side of the figure is operated so that this opening 31' of the valve opens to the atmosphere through the opening 40' of the slide part 20 of the valve, when the openings 31' and 40' are brought into registration with each other. Now, it will be noted that the branch pipe 19 of the pipe 96, coupled with the port 62 of the series $b$ is closed when the valve is arranged as shown in Figure 18, so that the suction created in the pipe 19 has no effect whatever on this side of the valve. But the port 63 is in communication with the port 61, so that the atmospheric pressure passes through the latter mentioned port into the port 63 and thence into the pipe 97. This pipe communicates with the opening 31' of the slide valve, and after the valve has been shifted to establish communication between this opening 30' and opening 29', the pressure passes from the pipe 97 through said vavle into the pipe 47 which of course conveys air into the upper end of the last mentioned cylinder 11. The operation of the mechanism is just the same for any speed forward, or reverse, that is to say that the rotary valve can be conveniently manipulated from the driver's seat and adjusted to establish communication between the proper openings of the valve, to selectively control the cylinders in the manner to shift the piston rod in either direction depending upon the particular speed and direction desired.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. In a motor operated vehicle, a transmission gear shift mechanism adapted to be actuated by the suction created by the motor, said mechanism including spaced pairs of cylinders, connected pistons arranged to operate in each pair of cylinders, means whereby a suction is created in one end of each cylinder of the pair used, and the air admitted or exhausted from the other end of said cylinder to shift the gears, automatically operable valves for controlling the communication between the intake manifold and the respective pairs of cylinders, whereby one pair operate at a time, and means under the control of the clutch pedal for rendering the mechanism inoperative when the pedal is in its normal position.

2. In a motor operated vehicle, a transmission gear shift mechanism including spaced pairs of cylinders, connected pistons arranged to reciprocate in the cylinders of each pair, means controlling the communication between the intake manifold and the cylinders of each pair, whereby a vacuum is created in one end of each cylinder of one pair, and air admitted and exhausted from the other ends of the respective cylinders of said pair in order to shift said gears, said means including a manually operable rotary valve to selectively operate the cylinders of the respective pairs, and an automatically operable slide valve for each pair of cylinders, the latter mentioned valve cooperating with the rotary valve so that only one pair of cylinders can be used at a time.

3. In a motor operated vehicle, a transmission gear shift mechanism including spaced pairs of cylinders, connected pistons arranged to reciprocate in the cylinders of each pair, a manually operable rotary valve designed to control communication between the intake manifold of the motor and the respective pairs of cylinders whereby a vacuum is created in one end of the particular pair of cylinders used, a slide valve for each pair of cylinders and designed to cooperate with the rotary valve whereby air is admitted into the other end of one cylinder of said pair being used, and air exhausted from the remaining end of the other cylinder of said pair, whereby only one pair of cylinders can be used at a time, means under the control of the clutch pedal to render the mechanism inoperative when said pedal is in its normal position.

In testimony whereof I affix my signature.

ELTON W. SPALDING.